C. H. STAAT.

ARTIFICIAL PLUME.

APPLICATION FILED FEB. 10, 1916.

Reissued Dec. 11, 1917.

14,410.

2 SHEETS—SHEET 1.

WITNESSES:

Emanuel E. Frangel

Ruth M. Kuselick

INVENTOR

Charles H. Staat

BY

Gustav Rasmus

ATTORNEY

C. H. STAAT.
ARTIFICIAL PLUME.
APPLICATION FILED FEB. 10, 1916.
Reissued Dec. 11, 1917.
14,410.
2 SHEETS—SHEET 2.
Fig-6-
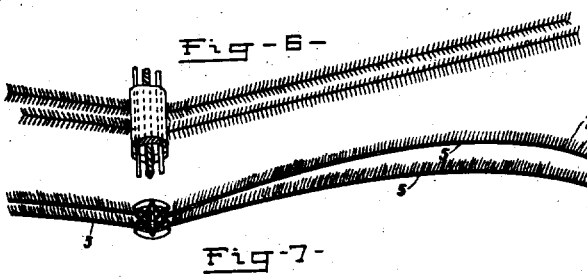
Fig-7-
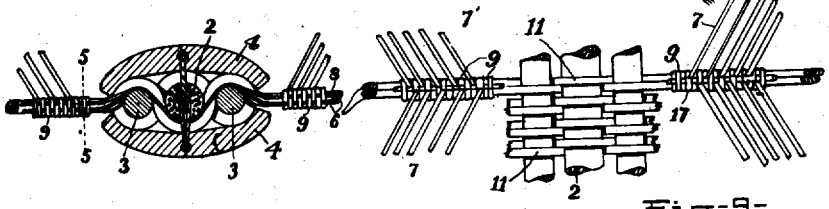
Fig-8-
Fig-9-
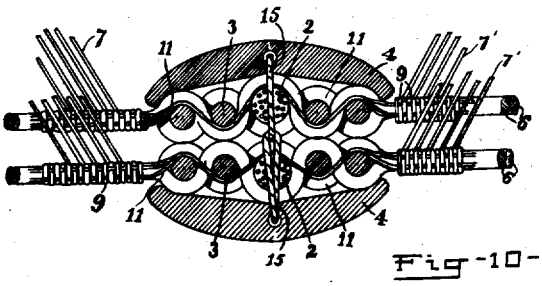
Fig-10-
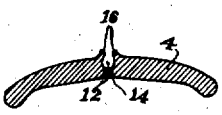
Fig-11-
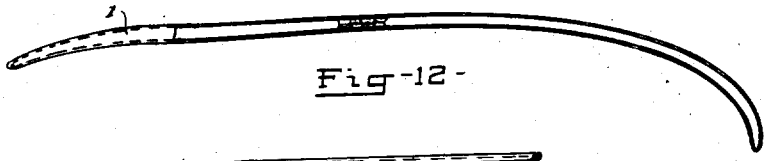
Fig-12-
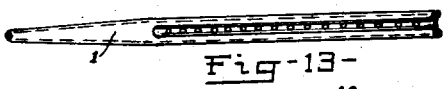
Fig-13-
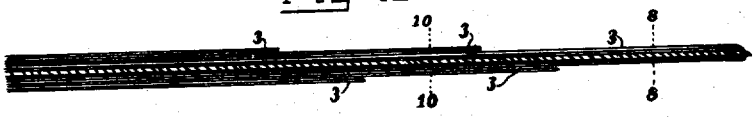
Fig-14-
WITNESSES:
Emanuel B. Kranzer.
Rich M. Hasselink
INVENTOR
Charles H. Staat
BY
Gustav Rasmus
ATTORNEY

UNITED STATES PATENT OFFICE.

CHARLES H. STAAT, OF BROOKLYN, NEW YORK.

ARTIFICIAL PLUME.

14,410. Specification of Reissued Letters Patent Reissued Dec. 11, 1917.

Original No. 1,095,532, dated May 5, 1914, Serial No. 593,785, filed November 23, 1910. Application for reissue filed February 10, 1916. Serial No. 77,538.

*To all whom it may concern:*

Be it known that I, CHARLES H. STAAT, a citizen of the United States, residing in the borough of Brooklyn, county of Kings, city and State of New York, have invented certain new and useful Improvements in Artificial Plumes, of which the following is a full, clear, and exact description.

This invention relates to an artificial ostrich feather or plume, and is intended to imitate as near as possible the natural plume of the ostrich and birds whose feathers are somewhat similar.

The principal object of my invention is to produce a plume whose structure will not be subject to derangement. This is accomplished by the improved form of main rib for the plume, the improved flue and the improved connection between the flue and main rib.

Another object is to build up the plume by means of "double" flues so that twice the ordinary number of flues can be arranged upon the main rib.

This artificial feather may be made of a very glossy, soft durable material such as silk combined with wires of the proper elasticity and strength and a celluloid substance, properly placed and fastened, to form the covering for the main rib or back bone. This evolves an article that will very favorably compare in beauty and surpass in strength and durability the natural feather. These with the qualities described below make a product of commerce which will be pleasing to the eye, soft, fluffy and light to the touch and comparatively inexpensive.

The construction of the artificial ostrich feather which I intend to produce is as follows: There is a main rib or back-bone composed of a tough elastic shiny substance that looks, in case of a white feather, like ivory. On two sides of this rib are a multiple of flues each having in turn a multiple of tiny feathers which when examined very closely resemble the natural feather. These natural flues range in length from about two to eight inches, but my artificial plume may be made to any length depending upon the quality of the feather desired. The length of the tiny feathers is also a matter of choice and taste.

Figure 1:
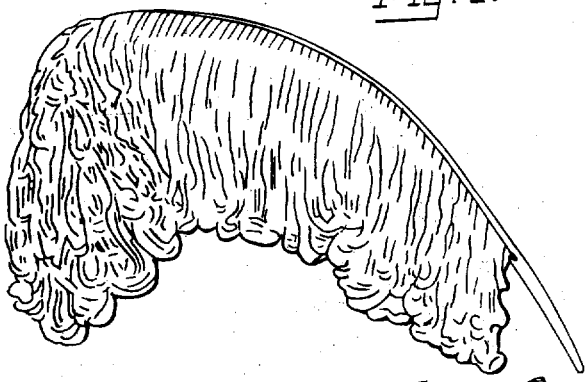
Figure 3:
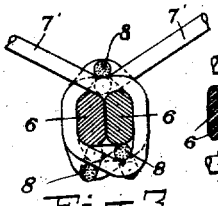
Figure 2:
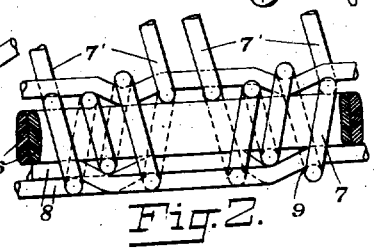
Figure 4:
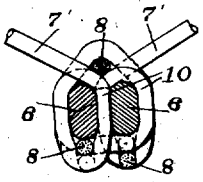
Figure 5:
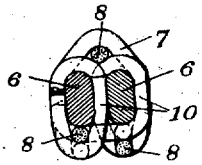

Referring to the drawings wherein like references refer to the same parts in all the views: Figure 1 is a perspective view of the completed feather. Fig. 2 shows the construction of the flues, the spaces between the warp and weft threads being exaggerated for that purpose. Figs. 3, 4 and 5 show sections of the flue to illustrate the method of producing the unitary structure and the means of preventing the spring wires from slipping relatively to each other. Figs. 6 and 7 show the double form of flue arrangement. Figs. 8, 9 and 10 show the type of weave which I have adopted for use at the point where the flue joins the main rib. Fig. 11 shows the celluloid backbone cover. Fig. 12 shows the finished quill. Fig. 13 shows the groove in the celluloid cover which serves as a sewing needle guide. Fig. 14 shows the relative arrangement of the rib wires composing the quill to give the latter its desired elasticity.

The reference character 1 indicates the quill of the imitation ostrich feather, the same being composed ordinarily of a cord 2 and spring wires 3 (see Fig. 8) preferably fine piano wires extended from tip to tip of the backbone. The cord is of a braided variety the purpose of which will later appear. As I gradually approach the quill of the artificial feather, additional wires are to be added (see Figs. 10 and 14) until at the quill end where the most strength is required the greatest number of wires will be found. The idea being that the feather must be perfectly elastic and at the same time stiff and strong in the place where stiffness and strength is required and not so stiff at the very tip where stiffness is not wanted. The covering 4 for these main rib wires is to be of celluloid or any of the various forms of celluloid under different trade names. The quill is to resemble as nearly as possible the natural quill of an ostrich feather and is to be hollow, but the extreme tips are to be closed.

Cross-wise of the main rib, as in the natural feather, the flues are adapted to extend. To give elasticity to each flue there are to be two very fine spring wires 6, preferably of the flattened oval shape as shown and arranged in Figs. 2, 3, 4, 5, 8 and 10. These wires are to be covered by delicate threads 7 and 8 so as to completely conceal the wire cores and a pile must seemingly project from these wires, as shown at 7'. Figs. 2, 3, 4, 8, 9 and 10. It will of course be understood that any material of proper resiliency may be used in place of wire.

Any number of threads 8 may be used but for illustrative purposes I have shown three which run parallel with the spring wire cores. The main object of these threads is to form a miniature warp which when acted upon by the threads that make complete turns around the wire cores and eventually forming the pile, makes a weave 9 that binds both warp and weft threads and this film of woven cloth surrounding the wires completely conceals them. There would be a tendency for this woven film together with the pile formation to slip on the wires, both diametrically and longitudinally, if it were not for the method of holding the threads which I have shown at 10, Figs. 4 and 5. Instead of having what I have preferably termed the weft threads always pass entirely around the wire cores I have arranged to have these threads pass occasionally between the wires.

The benefit that I derive by the turn of the weft threads is two-fold. First, the succeeding turns around the cores have a tendency by binding the two wires firmly together to pinch the thread that has been passed between them, thereby preventing the woven film from slipping longitudinally along the wires 6. Second, as I have previously mentioned, the wires 6 have a certain amount of elasticity. Now if these threads that are being pinched because of having been passed between two wires will hold the pile and film wire covering in place longitudinally, they must also be held diametrically in place, for if there was any tendency to move around the wires, these threads must either twist the spring wires, break the pinched threads, or which actually happens, hold the pile and film wire cover from twisting around the two wires 6.

Flues are to be made double, that is, two flues are to have the same arrangement in common to bind the same to the feather's main rib. By using this double flue single binding scheme, twice as many flues can be assembled on the main rib as there would be if each flue had its own binding loops. See Figs. 7, 8, 9, and 10 for this double arrangement.

In Figs. 7, 8, 9 and 10 I show the type of weave adopted for use at the point where the flue joins the main rib. It is to be noted that the pile has been omitted and the weave changed slightly at this point. The passing occasionally of the thread to be pinched between the wires 6, 6, is however, maintained. In the very middle of the two flues the weaving is to be omitted, the idea being to leave the wires 6 uncovered so that they will take up as little room on the main rib as possible and also that each individual wire in the flues can be bent as shown at 11 to accommodate the larger wires 3 and cord 2 of the feather's backbone. Those flues which are to be nearest the tip end of the feather will have three loops for connection to the main ribs. At a certain point down the main rib the flues are to have four loops. At the other points there will be five, six and seven, or as many loops 14 as the necessary number of main wires 3 for the backbone will be required to give it the proper strength. It will be noted that the cord 2 produces an additional loop.

The tip of each flue is to have its two wires twisted together, after which they are to be bent at about the same angle as that presented by the pile. See Fig. 7. When connected to the backbone as above described the resulting arrangement will be substantially that shown in Figs. 8, 9, and 10, Fig. 8 being a section on line 8—8 and Fig. 10 a section on line 10—10 of Fig. 14. The main wires 3 of the backbone will be placed as nearly as possible about the center cord or cords 2 in a symmetrical manner and will be bound one to the other by means of the flue loops which have been previously provided for. The loops when assembled on the backbone wires, it will be noted, present a type of wire weaving, the warp of which is the wires and cord or cords of the main rib and the weft being the loops of the flues.

It will be observed that the celluloid covers 4 before their application to the backbone have the grooves 12 and two raised portions 16. The function of the grooves is to provide a guide for the sewing needle. In the bottom of said grooves are perforations 14 for the thread 15 that passes through the same and through the braided cords 2. This thread which passes through the covers 4 and the cords 2 firmly binds the structure together, the cords being of the braided variety and thick enough and twisted to the right degree to allow the thread to pass therethrough and to prevent its movement thereafter; at least to allow but very little movement. And it will be noted that the passing of the thread through the cords at intervals gives a binding action upon the thread at the point where it is lodged in the cords.

The two wires and cord at the very tip of the feather will have to be twisted together to prevent the first few flues from slipping off. And after sewing has been completed the raised portions 16, which are primarily for the purpose of filling the grooves, will be worked down into said grooves for the purpose just mentioned. There are several known methods of working the celluloid ridges for filling up the above mentioned groove. Probably the best and simplest is by the application of a heated iron of right shape.

It is hardly necessary to state that when a very thick feather is required it will only be necessary to increase the number of main rib wires as well as the layers thereof, as shown in Fig. 10.

I do not wish to limit myself to the specific construction herein shown and described as various departures can be made therefrom in the size, proportions and different materials used, and still be within the scope of my invention.

Having thus described my invention, I claim:—

1. In an artificial ostrich feather, in combination, a main rib comprising a plurality of wires and a cord extending from tip to tip, and coverings for said wires and said cord, and flues projecting from either side of said rib and held in place by said main rib.

2. In an artificial ostrich feather, in combination, a main rib comprising a plurality of wires and a cord extending from tip to tip, a plurality of stiffening wires located at the side of and shorter than the aforesaid wires, and celluloid coverings for the wires and cord.

3. In an artificial ostrich feather or plume, in combination, a main rib or backbone, a plurality of wires and a cord therein, flues projecting from the side of said main rib, and a weaving connection between the main rib and the flues whereby the plume will retain its shape.

4. In an artificial ostrich feather or plume, in combination, a main rib or backbone comprising a plurality of wires and braided cord therein, an upper and a lower celluloid covering for said wires and cords and means passing through the cords for holding the covers in place.

5. In an artificial ostrich feather or plume, in combination, a main rib or backbone comprising a plurality of wires and a cord, flues connected to the main rib, said flues having resilient wires passing therethrough, said wires having loops where the flues connect with the main rib to engage the wires and cord of the latter, and means forming a part of the main rib for firmly uniting the main rib and the flues.

6. In an artificial ostrich feather or plume a flue comprising two spring wires passing therethrough, warp threads extending along said spring wires, weft threads passing around said wires and occasionally between them to prevent longitudinal and diametrical slipping of the said wires the said weft threads forming the pile of the plume.

7. In an artificial ostrich plume, in combination, a flue comprising spring wires passing therethrough, warp and weft threads passing along said spring wires and completely covering the same when woven together the ends of said weft threads forming the pile of the flues.

8. In an artificial ostrich plume, in combination, a main rib comprising a plurality of wires and a cord therein and arranged substantially in a plane, flues comprising spring wires passing therethrough, warp and weft threads passing along said spring wires and completely covering the same when woven together, the ends of said weft wires forming the pile of the flues, a woven connection between the flues and the main rib, the wires and cord of the main rib forming the warp and the wires of the flues the weft threads, and covering for the main rib.

9. In an artificial ostrich plume, in combination, a main rib comprising a plurality of wires and a cord and a covering therefor, a flue comprising wires and a woven covering therefor, and a woven connection between the main rib and the flue wherein the wires and cord of the main rib constitute the warp and the wires of the flue the weft threads.

10. In a plume of the kind described a flue constructed of warp threads and radiating weft threads, the warp threads being of a material which will give resiliency to the flue.

11. In a plume of the kind described a flue constructed of warp threads interwoven with weft threads, one of the warp threads being of resilient material.

12. In a plume of the kind described a flue constructed of a series of warp threads, some of said warp threads consisting of resilient material, the other threads of non-resilient material, the same being joined together by weft threads of silk.

13. An artificial feather containing a quill, flues secured to said quill, said flues constructed of warp threads of resilient material interwoven with weft threads as shown and described.

14. An artificial feather containing a quill, flues secured to said quill, said flues constructed of warp threads some of which warp threads are non-resilient and some resilient interwoven with silk weft threads as shown and described.

In testimony whereof I hereto affix my signature.

CHARLES H. STAAT.

Witnesses:
RUTH M. KUSSELUK,
JAMES E. MURPHY.

Copies of this patent may be obtained for five cents each, by addressing the "Commissioner of Patents, Washington, D. C."